United States Patent

Yoshikawa et al.

Patent Number: 5,271,977
Date of Patent: Dec. 21, 1993

[54] LOW PERMEABLE RUBBER HOSE

[75] Inventors: Masato Yoshikawa, Kodaira; Hideyuki Niwa; Yukio Fukuura, both of Sayama; Hideo Sugiyama, Higashimurayama; Kazuo Naito, Kawasaki, all of Japan

[73] Assignee: Bridgestone Corporation, Tokyo, Japan

[21] Appl. No.: 476,728

[22] Filed: Feb. 8, 1990

[30] Foreign Application Priority Data

Feb. 10, 1989 [JP] Japan ................ 1-31891
Feb. 10, 1989 [JP] Japan ................ 1-31892

[51] Int. Cl.⁵ ............... F16L 11/04; F16L 11/10
[52] U.S. Cl. ........................ 428/35.9; 428/35.8;
428/36.1; 428/34.6; 428/215; 428/216;
428/458; 428/465; 428/469; 428/472;
428/477.7; 428/625; 428/626; 428/632;
428/698; 428/702; 428/704; 138/138; 138/143;
138/146; 138/172

[58] Field of Search ............... 138/138, 137, 143, 132,
138/146, 172; 428/35.9, 35.8, 465, 458, 216,
202, 477.7, 36.1, 35.7, 34.6, 472, 469, 701, 702,
704, 698, 625, 626, 632, 215, 216

[56] References Cited

U.S. PATENT DOCUMENTS

| | | | |
|---|---|---|---|
| 2,581,920 | 1/1952 | Kuhn | 428/463 |
| 3,398,044 | 8/1968 | Plueddermann | 428/465 |
| 3,998,992 | 12/1976 | Nakamura | 428/469 |
| 4,049,875 | 9/1977 | Edie | 428/469 |
| 4,211,824 | 7/1980 | Yoshida | 428/469 |
| 4,552,791 | 11/1985 | Hahn | 428/35.7 |
| 4,702,963 | 10/1987 | Phillips | 428/480 |
| 4,758,455 | 7/1988 | Campbell | 428/35.9 |
| 4,806,351 | 2/1989 | Sugimoto et al. | 428/36.8 |
| 4,872,932 | 10/1989 | Yokishawa | 156/151 |
| 4,903,735 | 2/1990 | Delacour | 138/143 |

FOREIGN PATENT DOCUMENTS

| | | |
|---|---|---|
| 49-24567 | 6/1974 | Japan . |
| 54-177620 | 12/1979 | Japan . |
| 54-178221 | 12/1979 | Japan . |
| 56-162379 | 12/1981 | Japan . |
| 57-205144 | 12/1982 | Japan . |
| 58-94975 | 6/1983 | Japan . |
| 58-99582 | 7/1983 | Japan . |
| 58-158879 | 10/1983 | Japan . |
| 60-113882 | 6/1985 | Japan . |
| 60-113885 | 6/1985 | Japan . |
| 63-13812 | 3/1988 | Japan . |
| 63-45302 | 9/1988 | Japan . |
| 2210826 | 6/1989 | United Kingdom . |

Primary Examiner—Ellis P. Robinson
Assistant Examiner—Rena L. Dye
Attorney, Agent, or Firm—Birch, Stewart, Kolasch & Birch

[57] ABSTRACT

A rubber hose comprising an inner tube of synthetic resin, an optional undercoat of a metal or metal compound dry plated on the inner tube, a metal thin film sputtered or ion plated on the inner tube or undercoat from zinc, copper, cobalt, titanium, or an alloy thereof, and a rubber layer on the metal thin film exhibits low gas and solvent permeability while maintaining flexibility. Also provided is a low permeable rubber hose comprising an inner tube of synthetic resin, a thin film of a metal or metal compound dry plated on the inner tube, and a rubber layer heat cured to the thin film through an adhesive.

6 Claims, 3 Drawing Sheets

LOW PERMEABLE RUBBER HOSE

FIELD OF THE INVENTION

This invention relates to a rubber hose having improved gas and solvent impermeability.

BACKGROUND OF THE INVENTION

In the prior art, rubber hoses were generally used in a wide variety of uses as automobile fuel feed hoses, torque converter hoses, power steering hoses, air conditioner hoses, refrigerator hoses, propane gas feed hoses, hydraulic hoses as well as for household utility. A variety of media including water, oil, organic solvents, and gases are conducted through the rubber hoses. Therefore, the rubber hoses are required not only to be flexible, but also to be well resistant to these transfer media and fully impermeable to organic gases and organic solvents.

In general, rubber surfaces do not always exhibit high resistance against chemical loads such as organic gases and organic solvents. Prior art approaches for improving the organic gas and solvent resistance of rubber included (1) to use a rubber material having different polarity from the solvent, (2) to increase the degree of crosslinking of rubber, (3) to increase the amount of filler added, and (4) to increase the amount of rubber used, that is, wall thickness. Approach (1) requires expensive rubbers such as chloroprene rubber, butadiene-acrylonitrile rubber, acryl rubber, epichlorohydrin rubber, and fluororubber. Approach (2) detracts from softness and flexing resistance of rubber. Approach (3) has a limit in conjunction with processability and physical properties. The solvent resistance is improved only in proportion to a volume fraction of the filler. As to approach (4), an increased wall thickness adds to product weight and cost and detracts from softness. In addition to these problems, either of these approaches fails to increase the organic gas and solvent resistance of rubber beyond a certain limit.

In order to enhance the performance and the gas and solvent resistance of rubber hoses, a number of proposals were made for composite resin-rubber hoses. Typically a thin resin layer is applied to the inside surface of a rubber hose to be in contact with a transfer medium. In the composite structure, the resin layer serves for such functions as organic solvent resistance, gas impermeability, and chemical resistance while the outer rubber layer is responsible for functions such as softness and vibration absorption.

Composite rubber hoses are typically manufactured by coating a solvent soluble nylon film to the inside surface of a rubber hose as disclosed in Japanese Patent Application Kokai No. 113885/1985. Alternative methods are disclosed in Japanese Patent Publication No. 45302/1988 wherein a rubber hose is manufactured by extrusion coating a resin on a mandrel or shaping core for the hose to form a resin film. An adhesive is applied to the resin film. After drying, an intermediate rubber composition is coated, a reinforcing layer is braided, and an overcoating rubber layer is further coated. A final vulcanization shaping step completes a hose having improved organic gas and solvent resistance.

In the case of composite rubber hoses for accommodating coolant fluid for automobile air conditioners or the like, nylon resins are most often used as the resin forming the inner layer of the hose. A variety of nylon resins are used in practice including nylon 6, nylon 66, nylon 6/nylon 66 copolymer, nylon 11, nylon 12, nylon 4, copolymers thereof, modified ones, blends thereof, and blends of nylons and olefins.

The nylon used on the inner surface of rubber hoses for accommodating coolant fluid has to meet the following requirements:

(1) It has low permeability to Freon gas (gas impermeability).
(2) It is not susceptible to hydrolysis by moisture penetrating from outside of the hose (moisture resistance).
(3) It is resistant to heat.
(4) It withstands dynamic motion as in an impulse test.
(5) It is gas tight at a base or connector end.

With respect to these requirements, nylon 6, nylon 66, and nylon 6/nylon 66 copolymers are very low in Freon gas permeability, but relatively high in moisture permeability. In turn, nylon 11, nylon 12 and analogs are low in moisture permeability and less susceptible to hydrolysis, but moderately high in Freon gas permeability.

Some of these drawbacks may be eliminated by substituting a butyl rubber or Hypalon (chlorosulfonated polyethylene by E. I. duPont) having low moisture permeability for the rubber portion. The use of butyl rubber can reduce moisture permeation from the exterior. However, if the nylon layer contributing to Freon impermeability fails due to the presence of defects therein, such a failure would cause a serious failure of the entire hose because the butyl rubber layer is not resistant. In turn, the use of Hypalon is limited because it is expensive and difficult to bond.

Attempts have been made to blend nylon 6 or nylon 66 or a copolymer thereof having Freon gas impermeability with nylon 11 or nylon 12 having low moisture permeability or with olefin resins. These attempts improve moisture impermeability and hydrolysis resistance at the sacrifice of Freon gas impermeability.

Therefore, prior art combinations of rubber with nylons or the like were unsuccessful in fully satisfying the requirements of rubber hoses for transfer of coolant and similar fluids. It was thus proposed to wind a length of aluminum or copper strip or a length of plastic tape having such a metal thin film coated thereon around the outer periphery of a resinous inner tube, followed by coating a rubber layer thereon, or to form the inner surface of a rubber hose directly from a length of tape having a metal thin film coated thereon (see Japanese Utility Model Application Kokai Nos. 177620/1979, 198221/1979, 162379/1981, 94975/1983, 99582/1983, and 158879/1983, Japanese Patent Application Kokai No. 205144/1982, and Japanese Patent Publication No. 13812/1988).

These proposals take advantage of the barrier nature of a metal film to provide Freon and moisture impermeability, but suffer from various problems. Manufacture of these structures is complicated and thus expensive. When a length of metal foil or metallized tape is used, the seam between adjoining turns is simply a physical overlap. The turns can be displaced to form a gap therebetween under severe service conditions, resulting in a loss of the barrier nature of the metal thin film so that gas leakage can occur. Reduced softness is also a problem of these rubber hoses. Further, these methods generally use an adhesive in applying rubber on a metal foil or metallized tape wrap on a resinous inner tube to form a composite structure. The adhesive will deteriorate during a long period of service time and undesirably lose its adhesive force upon contact with an organic solvent that has penetrated through the resinous inner tube.

SUMMARY OF THE INVENTION

Therefore, an object of the present invention is to eliminate the above-mentioned drawbacks of prior art rubber hoses and to provide a novel and improved low permeable rubber hose of the composite structure including a resinous layer and a rubber layer in which solvent and moisture impermeability is improved without losing the softness characteristic of the rubber hose. Another object of the present invention is to provide such a composite rubber hose which is resistant against solvent and moisture and durable against bending and twisting forces. A further object of the present invention is to provide such a composite rubber hose which is free of an adhesive. A still further object of the present invention is to provide such a composite rubber hose which uses an adhesive, but can prevent the adhesive from losing its adhesive force.

According to a first aspect of the present invention, there is provided a low permeable rubber hose comprising an inner tube of a synthetic resin having an outer peripheral surface, a metal thin film on the outer peripheral surface of said inner tube, the metal thin film being formed by sputtering or ion plating from a member selected from the group consisting of zinc, copper, cobalt, titanium, and an alloy containing at least one of these metals, and a rubber layer on the metal thin film.

In one form, the metal thin film is formed directly on the outer peripheral surface of the inner tube. In another form, a thin film undercoat of a metal or metal compound is dry plated on the outer peripheral surface of the inner tube so that the undercoat intervenes between the inner tube and the metal thin film.

According to a second aspect of the present invention, there is provided a low permeable rubber hose comprising an inner tube of a synthetic resin having an outer peripheral surface, a thin film of a metal or metal compound dry plated on the outer peripheral surface of the inner tube, and a rubber layer heat cured to the thin film through an adhesive.

The inventors made efforts to solve the above-mentioned problems of a rubber hose of a composite structure having a synthetic resin inner layer and a rubber outer layer. We have found that the performance and process problems associated with the use of an adhesive can be overcome in two forms. The first form dispenses with an adhesive by forming a metal thin film of zinc, copper, cobalt, titanium, or an alloy containing at least one of these metals on the outer peripheral surface of a synthetic resin inner tube by dry plating, for example, sputtering or ion plating and then directly coating and vulcanizing a rubber composition to the metal thin film, because the rubber layer is firmly bonded to the underlying layer without an adhesive.

The second form utilizes a special measure to overcome the problems associated with an adhesive. A thin film of a metal or metal compound is formed on the outer peripheral surface of the inner tube by dry plating, for example, sputtering or ion plating, and a rubber layer is heat cured to the thin film through an adhesive. Then the adhesive layer is disposed outside the dry plated thin film having a good barrier property. This configuration eliminates the problem found in the prior art rubber hose having metal or metallized tape wrapped on a resin inner tube that the adhesive will lose its adhesive force upon contact with an organic solvent that has penetrated through the resinous inner tube.

In either form of the rubber hose configurations according to the present invention, the metal thin film or the metal or metal compound thin film dry plated is formed so evenly that impermeability against organic gas and moisture can be improved as well as resistance against solvent and moisture without detracting from the softness characteristic of the rubber hose. Unlike the prior art method involving wrapping of metal or metallized tape, the metal thin film or the metal or metal compound thin film dry plated does not lose its barrier property so that the synthetic resin inner tube and the rubber layer can maintain their bond via the thin film even in an impulse test. There is thus obtained a low permeable rubber hose which is durable against bending and twisting forces. The low permeable rubber hose of the invention can be continuously manufactured in an efficient manner since it suffices to add the dry plating step to the composite rubber hose manufacture process subsequent to the step of resin extrusion to form an inner tube.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Figure 1:
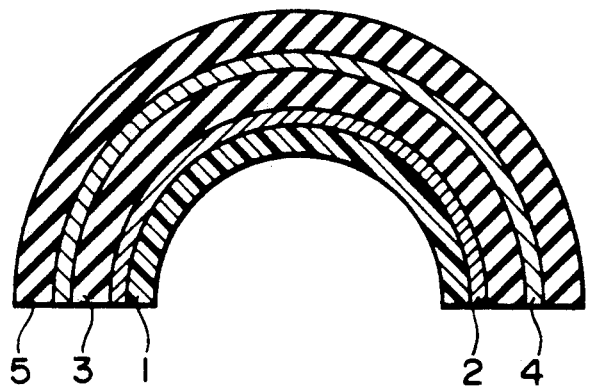
FIG. 1 is a transverse cross section of an upper half of a low permeable rubber hose according to a first embodiment of the invention.

Referring to FIG. 1, there is illustrated in transverse cross section a low permeable rubber hose according to the first embodiment of the present invention. The hose includes an inner tube 1 of a synthetic resin having an outer peripheral surface and an inner peripheral surface which is in direct contact with a fluid to be transferred through the hose. A metal thin film 2 is formed on the outer peripheral surface of the inner tube 1 by sputtering or ion plating a member selected from the group consisting of zinc, copper, cobalt, titanium, and an alloy containing at least one of these metals. A rubber layer 3 is coated on the metal thin film 2. A reinforcing layer 4 and a rubber sheath 5 are provided if desired. Thereafter the structure is heated and pressurized for vulcanization. It should be noted in this embodiment that the metal thin film 2 is formed directly on the outer peripheral surface of the inner tube 1.

Figure 2:
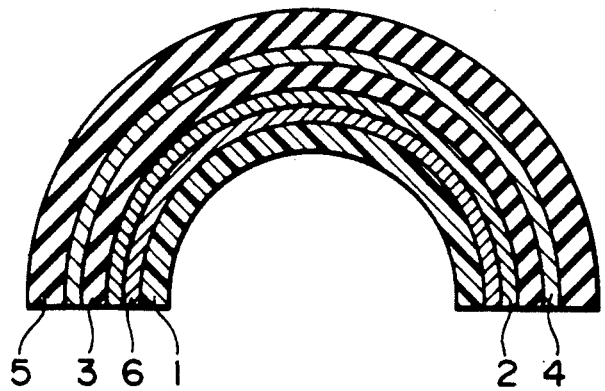
FIG. 2 is a cross section of a modification of the rubber hose of FIG. 1 having an undercoat of a metal or metal compound dry plated.

FIG. 2 illustrates in transverse cross section a modification of the low permeable rubber hose of FIG. 1. In some applications, an undercoat thin film 6 of a metal or metal compound is dry plated on the outer peripheral surface of an inner tube 1 of synthetic resin. A metal thin film 2 is formed on the undercoat 6 by sputtering or ion plating a member selected from the group consisting of zinc, copper, cobalt, titanium, and an alloy containing at least one of these metals. A rubber layer 3 is coated on the metal thin film 2. A reinforcing layer 4 and a rubber sheath 5 are provided if desired. Thereafter the structure is heated and pressurized for vulcanization. It should be noted in this modified embodiment that the undercoat 6 intervenes between the inner tube 1 and the metal thin film 2.

Figure 3:
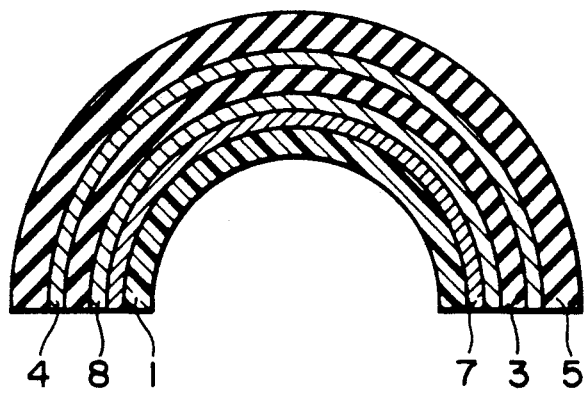
FIG. 3 is a transverse cross section of an upper half of a low permeable rubber hose according to a second embodiment of the invention.

FIG. 3 illustrates in transverse cross section a low permeable rubber hose according to the second embodiment of the invention. The hose includes an inner tube 1 of a synthetic resin having an outer peripheral surface and an inner peripheral surface which is in direct contact with a fluid to be transferred through the hose. A thin film 7 of a metal or metal compound is dry plated on the outer peripheral surface of the inner tube 1. An adhesive layer 8 and then a rubber layer 3 are coated onto the thin film 7 whereby the rubber layer 3 is bonded to the inner tube 1. A reinforcing layer 4 and a rubber sheath 5 are provided if desired. Thereafter the structure is heated and pressurized for vulcanization.

Resin Inner Tube

The low permeable rubber hose of the invention includes an inner tube of a synthetic resin. The synthetic resin of the inner tube may be suitably selected depending on the intended application of the hose. Since the metal thin film 2, undercoat 6 or thin film 7 according to the invention provides a barrier layer which mitigates the burden imposed on the resin layer, the material may be selected from a wider variety of resins than in the prior art. Examples of the useful resin include polyesters such as polyethylene, polypropylene, polybutene-1, polyallylate, polyethylene terephthalate, polybutylene terephthalate, polyoxybenzoyl, etc.; nylons such as nylon 6, nylon 66, nylon 11, nylon 12, nylon 4, nylon 6/66, nylon 6/10, nylon 6/12, etc.; polyamides such as aromatic polyamides; polyethers such as polyacetal, polyphenylene oxide, polyether ether ketone, polyphenylene sulfide, etc.; polysulfones such as polysulfone, polyether sulfone, etc.; polyimides such as polyether imides, polyamide imides, polybismaleimides, etc.; polycarbonate; fluoro resins such as polyvinyl fluoride, polyvinylidene fluoride, polytrifluoromcnochloroethylene, etc.; various copolymers such as ethylene tetrafluoroethylene copolymers, hexafluoropropylene tetrafluoroethylene copolymers, and perfluoroalkoxy-tetrafluoroethylene copolymers; and thermoplastic urethane, polyvinyl chloride, polyvinylidene chloride, vinyl chloride/vinylidene chloride copolymers, cross-linked vinyl chloride resins, silicone resins, polyurethanes, and the like. These resins may be used alone or as a blend of two or more of the foregoing resins. Also employable are a blend of such a resin with another polyolefin and a blend of such a resin with an elastomer such as rubber.

Also useful are composite plastic materials comprising any of the foregoing resins and a reinforcement in the form of highly stiff organic fibers such as glass fibers, carbon fibers, boron fibers, silicon carbide and Kevlar. Blends of any of the foregoing resins with carbon black, silica, calcium carbonate, clay, antioxidants or the like may also be used.

The inner tube may have a single layer structure or a laminate structure having two or more layers of the foregoing resins.

The inner tube may preferably have a wall thickness of from about 5 to about 300 $\mu$m, more preferably from about 10 to about 100 $\mu$m. A wall of thinner than 5 $\mu$m is often difficult to form as a film and has insufficient barrier properties whereas a wall of thicker than 300 $\mu$m will sometimes lack softness.

Prior to dry plating on the resin inner tube, a pretreatment, more particularly a wet or dry surface treatment is preferably carried out to activate the surface of the resin tube. The dry surface treatment may be either a mechanical treatment such as buffing or an electrical treatment such as corona discharge treatment, vacuum plasma treatment, and atmospheric plasma treatment. In the latter case, any surface treating gas may be used insofar as it can impart activity and wettability to the resin surface. Preferred surface treating gases include air, argon, oxygen, nitrogen, helium, carbon monoxide, carbon dioxide, carbon tetrafluoride, and the like alone or in admixture. The power source for generating an electric discharge may be any of those commonly used in electric discharge treatment including DC, AC, RF, and microwave power sources. Sputter etching is another useful pretreatment.

The wet surface treatment may be carried out in a conventional manner using mineral acids, organic halides or other agents.

Thin Films

According to the first embodiment, a metal thin film having both barrier and bonding functions is formed on the outer peripheral surface of the resinous inner tube. The metal thin film is formed by sputtering or ion plating a member selected from the group consisting of zinc, copper, cobalt, titanium, and an alloy containing at least one of these metals. The type of the alloy is not particularly limited insofar as it contains at least one of zinc, copper, cobalt, and titanium. Preferably, the alloy contains at least 50% by weight, more preferably at least 80% by weight of zinc, copper, cobalt, or titanium or a mixture thereof.

The thickness of the metal thin film is not particularly limited although a thickness of from 10 Å to 100 $\mu$m, especially from 10 Å to 1 $\mu$m is preferred for efficient thin film production.

The metal thin film of zinc, copper, cobalt, titanium, or an alloy containing at least one of these metals having both barrier and bonding functions is formed by sputtering or ion plating because an improved bond is achieved without detracting from the softness of the rubber hose or causing cracks.

The sputtering and ion plating may be carried out by any well-known methods. Those skilled in the art will make a proper choice for ion plating with respect to evaporation of a vapor source by resistance heating, induction heating, electron beam heating or the like, and ionization of vapor and acceleration of ionized vapor by RF plasma, DC voltage application, cluster beam, thermionic cathode mode or the like. Also for sputtering, a proper choice may be made of various sputtering modes including DC magnetron, bipolar DC, and RF sputtering.

Before the metal thin film of zinc, copper, cobalt, titanium or an alloy containing at least one of these metals is formed on the resinous inner tube, an undercoat thin film of another metal or metal compound may previously be formed on the outer periphery of the inner tube.

The metal or metal compound of the undercoat is not particularly limited insofar as the metal or metal compound for the undercoat is different from the metal for the above-mentioned metal thin film. It may be selected by taking into account the desired organic gas impermeability, organic solvent resistance, chemical resistance, water resistance, and moisture resistance. If desired, the undercoat may be of a multilayer structure using two or more different metals or metal compounds.

Examples of the metal having a barrier function include elemental metals such as iron, tin, aluminum, lead, nickel, chromium, indium, silver, molybdenum, and tungsten and alloys such as brass, bronze, copper-aluminum alloys, stainless steel, duralumin, Alumel, Chromel, carbon steel, nichrome, Hastelloy, and silver nickel. The metal compounds used herein include oxides, nitrides, carbides, and other metal compounds which can be deposited by dry plating, for example, $TiO_2$, $SiO_2$, $SiO$, $Al_2O_3$, $MgO$, $CaO$, $BeO$, $ZrO_2$, $ZnO$, $Zn-Sn-0$, $SnO_2$, $BN$, $TaN$, $TiN$, $ZrN$, $SiC$, $Ta_2C$, $TaC$, $TiC$, $WC$, $W_2C$, and $ZrC$.

The thickness of the undercoat is not particularly limited although it preferably ranges from 10 Å to 10 $\mu$m, especially from 50 Å to 1 $\mu$m for barrier performance, thin film productivity and no substantial effect on rubber hose softness.

The undercoat of a metal or metal compound is formed by dry plating, typically sputtering or ion plating because an improved bond is achieved without detracting from the softness of the rubber hose or causing cracks. Another dry plating technique may be used depending on the type of metal or metal compound for the undercoat. The dry plating of a metal or metal compound may be carried out by any well-known methods. Those skilled in the art will make a proper choice for dry plating with respect to operating parameters associated with a dry plating apparatus including a degree of vacuum, introduction of argon, oxygen and other gases, substrate temperature, and annealing. For ion plating, a proper choice may be made with respect to evaporation of a vapor source by resistance heating, induction heating, electron beam heating or the like, and ionization of vapor and acceleration of ionized vapor by RF plasma, DC voltage application, cluster beam, thermionic cathode mode or the like. Also for sputtering, a proper choice may be made of various sputtering modes including DC magnetron, bipolar DC, and RF sputtering. For example, an alloy thin film may be dry plated by providing a plurality of vapor sources which can be independently heated in a dry plating enclosure, and controlledly heating the respective vapor sources to evaporate different metals at desired rates for the alloy composition. In the case of sputtering, an alloy thin film may be formed using an alloy target or a plurality of different targets. Further a metal compound thin film may be formed either by directly forming a metal compound or by dry plating a metal in a reactive gas atmosphere to form a metal compound as it deposits. Direct formation and reactive sputtering are equally applicable.

The undercoat and the metal thin film may be continuously formed on the resinous inner tube by coaxial sputtering, or two or four side opposed sputtering. In the case of sputtering, plating efficiency can be improved by providing a permanent magnet or electromagnet to establish a magnetic field transverse to the electric field on the target surface. In the case of ion plating, an object to be treated, that is, an inner tube is usually traversed above a plating source because it is difficult to place the plating source above the object to be treated.

The steps of pretreatment and dry plating on the outer peripheral surface of the resinous inner tube are preferably made consecutive for efficient production. For example, an inner tube is introduced through a differential evacuation system into a vacuum chamber where a surface treatment is carried out by a vacuum plasma or the like followed by dry plating.

According to the second embodiment, a thin film of a metal or metal compound is formed on the outer peripheral surface of the resinous inner tube by dry plating. The thin film may be formed from a member selected from the group consisting of the metals and alloys enumerated in conjunction with the metal thin film, the metals, alloys, and metal compounds enumerated in conjunction with the undercoat, and alloys of metals of the former and latter groups. That is, the thin film may be formed from zinc, copper, cobalt, titanium, and an alloy containing at least one of these metals and iron, tin, aluminum, lead, nickel, chromium, indium, silver, molybdenum, and tungsten and alloys, for example, brass, bronze, copper-aluminum alloys, stainless steel, duralumin, Alumel, Chromel, carbon steel, nichrome, Hastelloy, and silver nickel as well as oxides, nitrides, carbides, and other metal compounds, for example, $TiO_2$, $SiO_2$, $SiO$, $Al_2O_3$, $MgO$, $CaO$, $BeO$, $ZrO_2$, $ZnO$, $Zn-Sn-O$, $SnO_2$, $BN$, $TaN$, $TiN$, $ZrN$, $SiC$, $Ta_2C$, $TaC$, $TiC$, $WC$, $W_2C$, and $ZrC$. The dry plating may be carried out in the same manner as previously described.

The thickness of the thin film is not particularly limited although a thickness of from 10 Å to 100 $\mu$m, especially from 10 Å to 1 $\mu$m is preferred for efficient thin film production.

The low permeable rubber hose of the second embodiment is fabricated by forming a thin film of such a metal or metal compound on the outer periphery of the resinous inner tube by dry plating, applying an adhesive thereto in a conventional manner, and applying a rubber layer thereto.

Adhesive

The adhesive used in the second embodiment may be selected from those adhesives well known to form a bond between rubber and metal. Examples include isocyanate adhesives, phenol resin adhesives, adhesives based on chlorinated rubber derivatives, cyclized rubber adhesives, rubber latex/protein adhesives, and resorcin-formalin-rubber latex adhesives. The dry plated thin film may preferably be primed with a silane or titanate adhesive promoter prior to application of the adhesive because a consistent adhesive bond is accomplished.

Preferred among the above-mentioned adhesives are organic solvent system adhesives, for example, isocyanate adhesives such as triphenylmethane triisocyanate commercially available as Desmodur R ® (Bayer A. G.) and diphenylmethane diisocyanate commercially available as Vulcabond TX ® (I.C.I. Co.), a mixture of chlorinated rubber and a nitroso compound commercially available as Chemlok-220 ® (Durham Chemical) and Thixon-511 ® (Dayton Chemical), and a mixture of an alkyl-modified phenol resin and nitrile rubber.

Also useful are aqueous dispersive adhesives, for example, a mixture of a resorcin-formalin precondensate and a rubber latex as well as those described in Japanese Patent Publication No. 24567/1974 and Japanese Patent Application Kokai No. 113882/1985.

Preferred examples of the silane adhesive promoters include γ-glycidoxypropyltrimethoxysilane, γ-mercaptopropyltrimethoxysilane, γ-aminopropyltriethoxysilane, γ-methacryloxypropyltrimethoxysilane, and vinyltriethoxysilane. Preferred examples of the titanate adhesive promoters include tetrabutyl titanate and tetraisopropyl titanate.

Rubber Layer

The rubber compound used to form the rubber layer according to both the first and second embodiments of the present invention may be natural rubber or a synthetic rubber having a carbon-to-carbon double bond in its structural formula alone or a blend of two or more rubbers.

Examples of the synthetic rubber used herein include homopolymers of conjugated dienes such as isoprene, butadiene, and chloroprene, for example, polyisoprene rubber, polybutadiene rubber, and polychloroprene rubber; copolymers of the conjugated dienes with vinyl compounds such as styrene, acrylonitrile, vinylpyridine, acrylic acid, methacrylic acid, alkyl acrylates, and alkyl methacrylates, for example, styrene-butadiene copolymer rubber, vinylpyridine-butadiene-styrene copolymer rubber, acrylonitrilebutadiene copolymer rubber, acrylic acid-butadiene copolymer rubber, methacrylic acid-butadiene copolymer rubber, methyl acrylate-butadiene copolymer rubber, and methyl methacrylate-butadiene copolymer rubber; copolymers of olefins such as ethylene, propylene and isobutylene with diene compounds, for example, isobutylene-isoprene copolymer rubber (IIR); copolymers of olefins with non-conjugated dienes (EPDM), for example, ethylene-propylene-cyclopentadiene terpolymers, ethylene-propylene-5-ethylidene-2-norbornene terpolymers, and ethylene-propylene-1,4-hexadiene terpolymers; polyalkenamers obtained by ring opening polymerization of cycloolefins, for example, polypentenamer; rubbers obtained by ring opening polymerization of oxysilane rings, for example, sulfur-vulcanizable polyepichlorohydrin rubber; and polypropylene oxide rubber. Halogenated products of the foregoing rubbers are also employable, for example, chlorinated isobutylene-isoprene copolymer rubber (Cl-IIR) and brominated isobutylene-isoprene copolymer rubber (Br-IIR). Ring opened polymers of norbornene may be used. Further useful are rubber blends, for example, blends of the foregoing rubbers with saturated elastomers such as epichlorohydrin rubber, hydrogenated nitrile rubber, polypropylene oxide rubber, and chlorosulfonated polyethylene.

A rubber composition may be prepared by adding any desired additives to the rubber compound in accordance with an ordinary practice depending on a particular purpose and application intended for the rubber hose. The useful additives are fillers such as carbon black, silica, calcium carbonate, calcium sulfate, clay, diatomaceous earth, and mica; softeners such as mineral oils, vegetable oils, and synthetic plasticizers; vulcanization promoters such as stearic acid; antioxidants; cross-linking agents such as sulfur; adhesion promoters such as cobalt salts; and the like.

After the rubber composition is applied to the metal thin film on the inner tube or to the adhesive layer on the thin film on the inner tube, a braid may be applied for reinforcement and a rubber composition may be applied to form a jacket or sheath if desired. The resulting structure is then heated and pressurized in a conventional manner for vulcanization, accomplishing the formation of the rubber layer.

The rubber layer preferably has a thickness in the range of from 100 to 5,000 μm.

In the first embodiment where a metal thin film of zinc, copper, cobalt, titanium or an alloy containing at least one of these metals is dry plated on the inner tube, vulcanization of the rubber composition establishes a strong bond between the rubber layer and the metal thin film without an adhesive. To this end, either sulfur vulcanization or vulcanization with organic sulfur compounds such as dithiodimorpholine and thiuram type vulcanization may be used.

The equipment for use in vulcanization may be selected from pressurized can equipment, fluidized bed equipment, and lead and plastic sheathed microwave curing equipment.

The low permeable rubber hose of the invention may be fabricated in accordance with the prior art method for fabricating synthetic resin-rubber composite hoses except that a dry plating step is added thereto.

Figure 4:
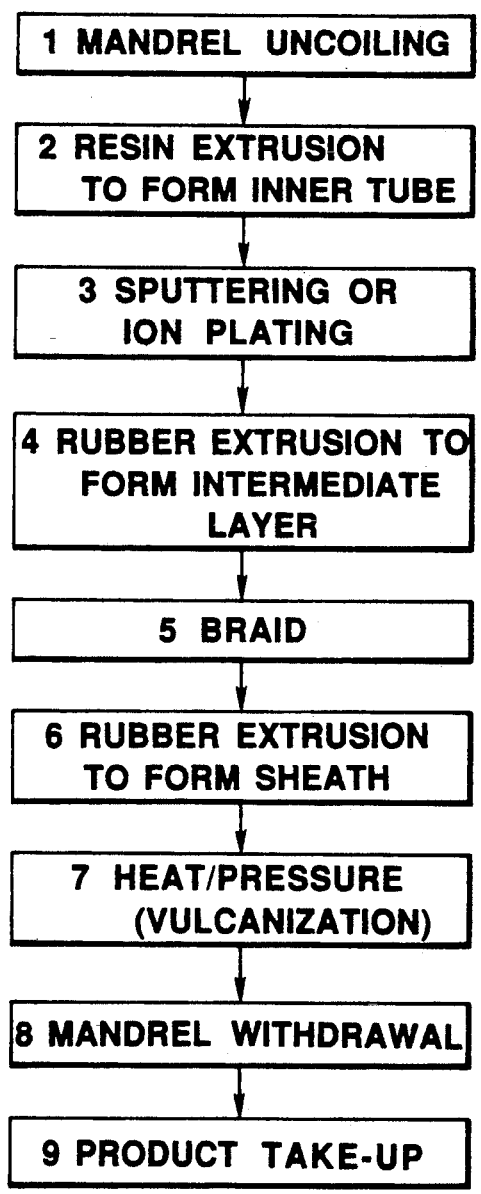
FIG. 4 is a diagram illustrating the steps in the manufacture of the rubber hose according to the first embodiment of the invention.

Referring to FIG. 4, the method for manufacturing the rubber hose according to the first embodiment of the invention is described. In step (1), a mandrel or core of rubber, iron or plastic material is uncoiled. Step (2) is to coat the mandrel with a resin in an even thin film form to form a resin tube. Step (3) is to form a metal thin film of zinc, copper, cobalt, titanium or an alloy containing at least one of these metals on the outer periphery of the resin tube by sputtering or ion plating. Step (3) may include a pre-step of forming an undercoat of a metal or metal compound on the outer periphery of the resin tube by dry plating, typically sputtering or ion plating. The metal of the undercoat should be different from that of the subsequently applied metal thin film. Step (4) is to extrude rubber to form a coaxial circular intermediate tube. Step (5) is to apply a braid of steel wire or organic fibers or cords to the intermediate tube to form a reinforcing layer for reinforcement to withstand pressure and external forces. Step (6) is to extrude rubber thereon to form a sheath. Steps (5) and (6) may be omitted. Step (7) is to apply heat and pressure to the resulting structure for vulcanization. The mandrel is removed from the vulcanized hose in step (8). The thus completed hose is finally taken up on a reel in step (9).

The low permeable rubber hose according to the first embodiment of the invention may be fabricated in accordance with the conventional rubber hose manufacture method with a simple modification thereto by adding a dry plating step (3) instead of the adhesive coating and drying steps. The existing rubber hose manufacture plant may be used without a substantial modification.

The method for manufacturing the rubber hose according to the second embodiment of the invention is similar to that for the first embodiment, but briefly described with reference to FIG. 5. In step (1), a mandrel is unwound. Step (2) is to coat the mandrel with a resin in an even thin film form to form a resin tube. Step (3) is to form a thin film of a metal, alloy or metal compound on the outer periphery of the resin tube by dry plating, typically sputtering or ion plating. Step (4) is to apply an adhesive to the thin film followed by drying in step (5). Step (6) is to extrude rubber to form a coaxial circular intermediate tube. If desired, a braid of reinforcement is applied in step (7) and rubber is extruded thereon to form a sheath in step (8). Step (9) is to apply heat and pressure to the resulting structure for vulcanization. The mandrel is removed from the vulcanized hose in step (10). The thus completed hose is finally taken up on a reel in step (11).

The low permeable rubber hose according to the second embodiment of the invention may be fabricated in accordance with the conventional rubber hose manufacture method with a simple modification thereto by adding a dry plating step (3) thereto. The existing rubber hose manufacture plant may be used without a substantial modification.

Since a thin film of a metal, alloy or metal compound having barrier properties is interposed between the resinous inner tube and the rubber layer, the low permeable rubber hose of the invention exhibits improved solvent resistance, organic gas impermeability, moisture resistance, water resistance, and chemical resistance without a loss of the softness of rubber hose. It also possesses improved fatigue resistance and durability against bending and twisting forces.

Because of improved solvent resistance, organic gas impermeability, and moisture impermeability as well as maintained softness, the low permeable rubber hose of the invention finds a wide variety of uses as household hoses, hoses in fuel transfer, torque converter, power steering, and air conditioning systems of automobiles, hoses for refrigerant fluid transfer in air conditioners and refrigerators, natural and propane gas transfer hoses, hydraulic hoses, and rubber couplings.

EXAMPLE

Examples of the present invention are given below by way of illustration and not by way of limitation.

EXAMPLE 1

A low permeable rubber hose according to the first embodiment of the invention was manufactured by following the procedure shown in FIG. 4.

A mandrel was coated with a nylon 6/66 copolymer resin to a thickness of 50 μm and then introduced into a vacuum chamber through a differential evacuation system. The resin tube was surface treated by a vacuum plasma. The resin tube was then coated with a cobalt film to a thickness of 1,000 Å by magnetron sputtering. The cobalt coated resin tube on the mandrel was moved back to the ambient atmosphere through the differential evacuation system.

A rubber composition having the formulation shown in Table 1 was extruded on the tube to a thickness of 2 mm. A reinforcing fiber layer of 1 mm thick was braided on the rubber layer and a rubber composition having the same formulation was again extruded to form a sheath having a thickness of 1.5 mm. The structure was vulcanized at 145° C. for 20 minutes.

TABLE 1

| Ingredients | Parts by weight |
| --- | --- |
| Natural rubber | 85 |
| Styrene-butadiene rubber | 15 |
| Carbon black (FEF) | 45 |
| Mineral oil | 5 |
| Antioxidant* | 0.7 |
| Stearic acid | 0.5 |

TABLE 1-continued

| Ingredients | Parts by weight |
| --- | --- |
| Zinc oxide | 5 |
| Vulcanization accelerator** | 0.8 |
| Sulfur | 2 |

*N-phenyl-N'-isopropyl-p-phenylenediamine (Ouchi Sinko K.K.)
**N-oxydiethylene-2-benzothiazole sulfamide (Ouchi Sinko K.K.)

For comparison purposes, a rubber hose was manufactured by the same procedure as above except that the sputtering step was omitted, that is, the cobalt film was not formed. The present rubber hose (Invention) and the comparative rubber hose were measured for Freon permeability and moisture permeability. The Freon permeability is expressed by the quantity (gram/m) of Freon 12 dissipated or volatilized from within the hose at 100° C. for 72 hours. The moisture permeability is expressed by the quantity (gram/m) of moisture absorbed in the hose at 60° C. and RH 95% for 72 hours.

The results are shown in Table 2.

TABLE 2

|  | Present hose with Co film | Comparative hose without Co film |
| --- | --- | --- |
| Freon permeability | 1.5 | 1.8 |
| Moisture permeability | 1.5 | 3.0 |

As is evident from Table 2, formation of a cobalt thin film results in improved impermeability against Freon and moisture.

The hose of this example was found to provide a firm bond between the nylon inner tube and the rubber intermediate layer as demonstrated by a cohesive failure occurring in the rubber layer in a bond strength test.

EXAMPLE 2

A rubber hose was manufactured by approximately the same procedure as in Example 1.

A mandrel was coated with an ethylene-tetrafluoro-ethylene copolymer instead of the nylon to a thickness of 50 μm. The resin tube was coated with cobalt or brass (zinc-copper alloy) in the same manner as in Example 1. Then an intermediate rubber layer, a reinforcing layer, and a sheath rubber layer were applied and vulcanized as in Example 1.

In the resulting rubber hose, the rubber layer firmly bonded to the resin inner tube. In a comparative rubber hose which was prepared by the same procedure as above except that no metal thin film was formed, the rubber layer did not bond to the resin inner tube unless an adhesive was applied.

EXAMPLE 3

A rubber hose was manufactured by the same procedure as in Example 1 except that the rubber composition coated on the cobalt thin film was changed to a nitrile rubber composition as shown in Table 3.

TABLE 3

| Ingredients | Parts by weight |
| --- | --- |
| NBR (acrylonitrile content 35%) | 100 |
| Plasticizer (DOP) | 5 |
| Carbon black (SRF) | 75 |
| Antioxidant* | 1 |
| Stearic acid | 0.5 |
| Zinc oxide | 3 |
| Vulcanization accelerator** | 2 |

TABLE 3-continued

| Ingredients | Parts by weight |
|---|---|
| Sulfur | 2.5 |

*Polymerized 2.2.4-trimethyl-1.2-dihydroquinoline (Ouchi Sinko K.K.)
**tetrabutylthiuram disulfide (Ouchi Sinko K.K.)

For performance evaluation, the hose was subjected to a gas permeation test (gas leakage test) and an impulse test.

The impulse test was a hydraulic pressure test in which the hose was charged with MIL 5606 oil at 100° C. and alternately pressurized to an internal pressure of 0 and 30 kg/cm$^2$ by means of a pump. The test included 150,000 cycles at a rate of 45 cycles/min. At the end of the test, the hose was disintegrated to examine any failure in the wall.

In the Freon permeation test, the rubber hose allowed only 1 gram of Freon 12 gas to permeate therethrough at 100° C. for 72 hours. In a vacuum test in which the hose interior was evacuated to a vacuum of 150 mmHg, it withstood the test without a separation between the nylon inner tube and the intermediate nitrile rubber layer. It also withstood the impulse test over 150,000 cycles.

A comparative rubber hose which was prepared by the same procedure as above except that the cobalt thin film was not formed could not withstand the vacuum test in that a separation occurred between the nylon 6/66 copolymer inner tube and the intermediate nitrile rubber layer.

EXAMPLE 4

A rubber hose was prepared by substantially the same procedure as in Example 1 by coating a rubber mandrel with a nylon 6/66 copolymer resin to a thickness of 50 μm. The nylon inner tube was coated with an aluminum thin film to a thickness of 300 Å and then with a cobalt thin film to a thickness of 200 Å. Thereafter, the metallized inner tube was coated with the same nitrile rubber as used in Example 3.

In the Freon permeation test, the rubber hose allowed only 1 gram of Freon 12 gas to permeate therethrough at 100° C. for 72 hours. In a vacuum test in which the hose interior was evacuated to a vacuum of 150 mmHg, it withstood the test without a separation between the nylon inner tube and the intermediate nitrile rubber layer. It also withstood the impulse test over 150,000 cycles.

A comparative rubber hose in which the aluminum thin film was similarly formed, but the cobalt thin film was not formed could not withstand the vacuum test in that a separation occurred between the nylon 6/66 copolymer inner tube and the intermediate nitrile rubber layer.

EXAMPLE 5

A rubber hose was prepared by substantially the same procedure as in Example 1 by coating a rubber mandrel with a nylon 6/66 copolymer resin to a thickness of 50 μm. The nylon inner tube was coated with an aluminum thin film to a thickness of 300 Å by plasma sputtering. Then a metal thin film having a bonding function was formed thereon to a thickness of 300 Å by plasma sputtering. The metal thin films designated samples A, B, C, and D were zinc, copper, brass (70/30 copper/zinc alloy), and titanium.

Thereafter, a rubber composition having the formulation shown in Table 4 was extrusion coated on the metallized inner tube to a thickness of 2 mm. A reinforcing fiber layer was braided and a rubber composition having the same formulation as above was further extruded to form a sheath of 1.5 mm thick. The structure was vulcanized at 145° C. for 30 minutes.

TABLE 4

| Ingredients | Parts by weight |
|---|---|
| Natural rubber | 80 |
| Styrene-butadiene rubber | 20 |
| Carbon black (HAF) | 50 |
| Spindle oil | 5 |
| Antioxidant* | 0.5 |
| Stearic acid | 0.5 |
| Zinc oxide | 3 |
| Vulcanization accelerator** | 0.7 |
| Cobalt naphthenate | 2 |
| Sulfur | 2.5 |

*N-phenyl-N'-isopropyl-p-phenylenediamine (Ouchi Sinko K.K.)
**N-oxydiethylene-2-benzothiazole sulfamide (Ouchi Sinko K.K.)

The rubber hose was measured for Freon permeability and moisture permeability. The Freon permeability is expressed by the quantity (gram/m) of Freon 12 dissipated or volatilized from within the hose at 100° C. for 72 hours. The moisture permeability is expressed by the quantity of moisture absorbed in the hose at 60° C. and RH 95% for 72 hours. The bond between the nylon inner tube and the intermediate rubber layer was examined by vacuum and impulse tests.

For comparison purposes, a rubber hose designated sample E was prepared as above by forming only an aluminum thin film, but not a metal thin film having a bonding function. It was also examined by the same tests as above. The results are shown in Table 5.

TABLE 5

| | A | B | C | D | E* |
|---|---|---|---|---|---|
| Metal thin film | | | | | |
| Barrier layer | Al | Al | Al | Al | Al |
| Bonding layer | Zn | Cu | Brass | Ti | — |
| Freon permeability | 1.4 | 1.3 | 1.3 | 1.3 | 1.8 |
| Moisture permeability | 1.5 | 1.4 | 1.4 | 1.3 | 3.0 |
| Separation | Good | Good | Good | Good | Poor |
| | | (cohesive failure in rubber layer) | | | (interfacial separation) |
| Impulse test | | No change at the interface | | | Interfacial separation Nylon failure |

*outside the scope of the invention

As seen from Table 5, the samples A, B, C, and D of this example provide an excellent bond between the rubber and the nylon and controlled Freon and moisture permeability as compared with comparative sample E.

EXAMPLE 6

Figure 5:
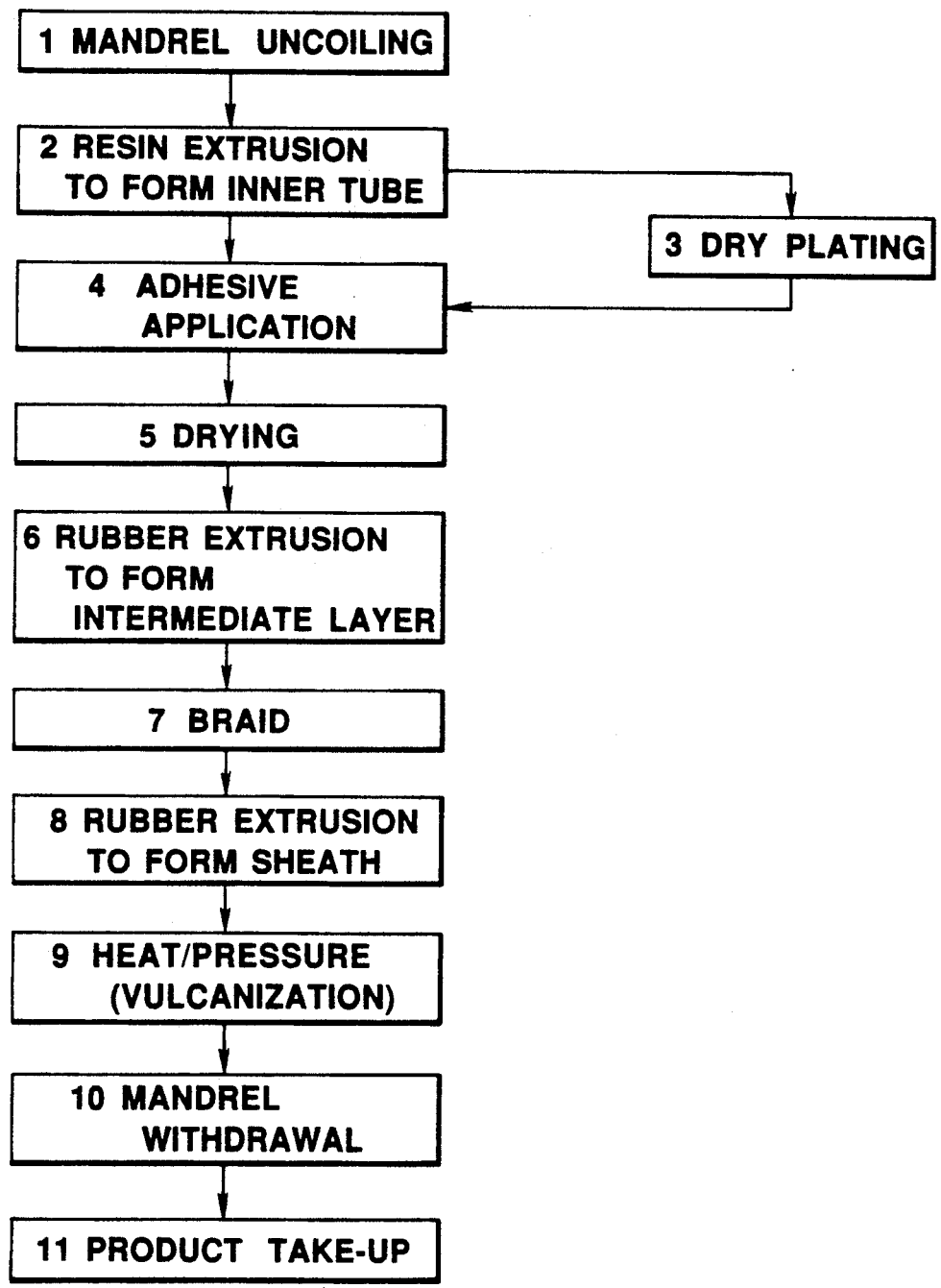
FIG. 5 is a diagram illustrating the steps in the manufacture of the rubber hose according to the second embodiment of the invention.

A low permeable rubber hose according to the second embodiment of the invention was manufactured by following the procedure shown in FIG. 5.

A mandrel was coated with a nylon 6/66 copolymer resin to a thickness of 50 μm and then introduced into a vacuum chamber through a differential evacuation system. The resin tube was surface treated by a vacuum plasma. The resin tube was then coated with an aluminum film to a thickness of 1,000 Å by magnetron sputtering. The aluminum coated resin tube on the mandrel was moved back to the ambient atmosphere through the differential evacuation system.

The metallized tube was then coated with a dilute solution of γ-glycidoxypropyltrimethoxysilane and then with an isocyanate adhesive, Desmodur R (Bayer A.G.). After drying, a rubber composition having the formulation shown in Table 1 was extruded on the tube to a thickness of 2 mm. A reinforcing fiber layer of 1 mm thick was braided on the rubber layer and a rubber composition having the same formulation was again extruded to form a sheath having a thickness of 1.5 mm. The structure was vulcanized at 145° C. for 20 minutes. The present rubber hose is designated sample No. 6-1.

For comparison purposes, a rubber hose designated sample No. 6-2 was manufactured by the same procedure as above except that the dry plating step was omitted, that is, the aluminum film was not formed. Another rubber hose designated sample No. 6-3 was manufactured by the same procedure as above in which an aluminum film was formed by dry plating, but no adhesive was applied. Rubber hose sample Nos. 6-1, 6-2 and 6-3 were measured for Freon permeability and moisture permeability. The Freon permeability is expressed by the quantity (gram/m) of Freon 12 dissipated or volatilized from within the hose at 100° C. for 72 hours. The moisture permeability is expressed by the quantity (gram/m) of moisture absorbed in the hose at 60° C. and RH 95% for 72 hours. Further a separation test was carried out to evaluate the bond between the nylon inner tube and the rubber intermediate layer.

The results are shown in Table 6.

TABLE 6

|  | 6-1 | 6-2* | 6-3* |
|---|---|---|---|
| Structure |  |  |  |
| Aluminum thin film | Yes | No | Yes |
| Adhesive applied | Yes | Yes | No |
| Properties |  |  |  |
| Freon permeability | 1.5 | 1.8 | 1.6 |
| Moisture permeability | 1.5 | 3.0 | 1.7 |
| Bond | cohesive failure in rubber layer |  | nylon/rubber complete separation |

*outside the scope of the invention

As is evident from Table 6, the rubber hose in which an aluminum thin film was formed and an adhesive was applied thereto showed improved impermeability against Freon and moisture and a strong bond between the nylon inner tube and the rubber intermediate layer, satisfying the hose requirements.

EXAMPLE 7

A rubber hose was manufactured by the same procedure as in Example 6 except that the rubber composition coated on the aluminum thin film was changed to a nitrile rubber composition as shown in Table 7.

TABLE 7

| Ingredients | Parts by weight |
|---|---|
| NBR (acrylonitrile content 35%) | 100 |
| Liquid NBR | 10 |
| Carbon black (SRF) | 100 |
| Antioxidant* | 1 |
| Stearic acid | 0.5 |
| Zinc oxide | 1 |
| Vulcanization accelerator** | 2 |
| Vulcanization accelerator*** | 0.5 |

TABLE 7-continued

| Ingredients | Parts by weight |
|---|---|
| Sulfur | 2 |

*Polymerized 2,2,4-trimethyl-1,2-dihydroquinoline (Ouchi Sinko K.K.)
**tetrabutylthiuram disulfide (Ouchi Sinko K.K.)
***dibenzothiazyl disulfide (Ouch Sinko K.K.)

For performance evaluation, the hose was subjected to a gas permeation test (gas leakage test) and an impulse test as described in Example 3.

In the Freon permeation test, the rubber hose allowed only 1 gram of Freon 12 gas to permeate therethrough at 100° C. for 72 hours. In a vacuum test in which the hose interior was evacuated to a vacuum of 150 mmHg, it withstood the test without a separation between the nylon inner tube and the intermediate nitrile rubber layer. It also withstood the impulse test over 150,000 cycles.

Examples 8 and 9 are given to show the performance of metallized films to assist in understanding of the invention.

EXAMPLE 8

Disks having a diameter of 70 mm were cut out from a 50-μm thick film of nylon 6/66 copolymer (manufactured by BASF) and a 50-μm thick film of polyethylene terephthalate (PET, manufactured by Teijin K.K.).

The disks on the surface were degreased with a solvent. They were set on a substrate holder in a vacuum chamber of a magnetron sputtering equipment. The chamber was evacuated vacuum of $10^{-5}$ Torr or lower, and a minor amount of argon gas was introduced to adjust the vacuum to 0.1 Torr. The films on the surface were cleaned by an RF glow discharge at 13.56 MHz.

At the end of cleaning, the RF glow discharge was interrupted. With a DC voltage of −600 volts applied to a metal sample target, argon plasma sputtering was carried out with a target current flow of 0.5 amperes, depositing a metal thin film on the disk surface. The metals used herein were aluminum and cobalt, each of which was formed to thicknesses of 200 Å and 3,000 Å.

The metallized disks and the control disks (without a metal thin film) were examined for moisture permeability by a moisture permeation cup test. The moisture permeability was expressed by a percent increase in weight of silica gel in a cup at 50° C. and RH 90%.

The results are shown in Table 8.

TABLE 8

| Film | Moisture Permeability | |
|---|---|---|
|  | Nylon 6/66 | PET |
| No metallization | 13.1% | 0.29% |
| Al thin film, |  |  |
| 200 Å | 5.1% | 0.18% |
| 3000 Å | 1.9% | 0.04% |
| Co thin film, |  |  |
| 200 Å | 5.7% | — |
| 3000 Å | 5.2% | — |

As is evident from Table 8, dry coating of a metal thin film on a plastic substrate results in a significant improvement in moisture impermeability.

EXAMPLE 9

A 100-μm thick film of nylon 12 (manufactured by Ube Kosan K.K.) was coated on the surface with aluminum to a thickness of 250 Å as in Example 8.

The aluminum coated film and the control film (without metallization) were examined for permeation of Freon 12 at 100° C. using a gas permeation tester (Yanagimoto K.K.).

The results are shown in Table 9.

TABLE 9

|  | Freon 12 permeation |
|---|---|
| Control film | $25 \times 10^{-4}$ cc/cm$^2$ · hr |
| Aluminum coated film | $3 \times 10^{-4}$ cc/cm$^2$ · hr |

As is evident from Table 9, the Freon 12 impermeability of a nylon 12 film can be drastically increased by a factor of 8 to 10 by forming an aluminum film of thinner than 300 Å thereon.

Although some preferred embodiments have been described, many modifications and variations may be made thereto in the light of the above teachings. It is therefore to be understood that within the scope of the appended claims, the invention may be practiced otherwise than as specifically described.

We claim:

1. A low permeable rubber hose, comprising:
   an inner tube of synthetic resin having an outer peripheral surface, said inner tube having a thickness of 5 to 300 μm,
   a thin film of a metal compound continuously dry plated on the outer peripheral surface of said inner tube and having a thickness of 10 Å to 100 μm, wherein said thin film is of a metal compound selected from the group consisting of TiO$_2$, SiO$_2$, SiO, Al$_2$O$_3$, MgO, CaO, BeO, ZrO$_2$, ZnO, Zn-Sn-O, SnO$_2$, BN, TaN, TiN, ZrN, SiC, Ta$_2$C, TaC, TiC, WC, W$_2$C, and ZrC, and
   a rubber layer, having a thickness of 100 to 5000 μm, heat cured to said thin film through an adhesive,
   said low permeable rubber hose being capable of preventing freon gas which may flow in said inner tube from permeating to said rubber layer and at the same time preventing outer moisture from permeating to said inner tube.

2. The rubber hose of claim 1, wherein a reinforcing layer is provided on said rubber layer and a rubber sheath is provided on said reinforcing layer.

3. A low permeable rubber hose, comprising:
   an inner tube of a synthetic resin having an outer peripheral surface, said inner tube having a thickness of 5 to 300 μm,
   a metal thin film having a thickness of 10 Å to 100 μm on the outer peripheral surface of said inner tube, said metal thin film being formed by sputtering or ion plating a member selected from the group consisting of zinc, copper, cobalt, titanium, and an alloy containing at least one of these metals, wherein said metal thin film is continuously formed directly on the outer peripheral surface of said inner tube, and
   a rubber layer, having a thickness of 100 to 5000 μm, vulcanized to said metal thin film,
   an undercoat of 10 Å to 10 μm in thickness of a metal or metal compound dry plated on the outer peripheral surface of said inner tube so that the undercoat intervenes between said inner tube and said metal thin film, and
   said low permeable rubber hose being capable of preventing freon gas which may flow in said inner tube from permeating to said rubber layer and at the same time preventing outer moisture from permeating to said inner tube.

4. The rubber hose of any one of claim 3, wherein said metal thin film is of an alloy containing at least 50% by weight of a metal selected from the group consisting of zinc, copper, cobalt, and titanium.

5. The rubber hose of claim 3, wherein said undercoat is of a metal or alloy selected from the group consisting of iron, tin, aluminum, lead, nickel, chromium, indium, silver, molybdenum, tungsten, brass, bronze, copper-aluminum alloys, stainless steel, carbon steel, nichrome, and nickel silver.

6. The rubber hose of claim 3, wherein said undercoat is of a metal compound selected from the group consisting of TiO$_2$, SiO$_2$, SiO, Al$_2$O$_3$, MgO, CaO, BeO, ZrO$_2$, ZnO, Zn-Sn-O, SnO$_2$, BN, TaN, TiN, ZrN, SiC, Ta$_2$C, TaC, TiC, WC, W$_2$C, and ZrC.

* * * * *